United States Patent [19]

McDonald et al.

[11] Patent Number: 4,910,053
[45] Date of Patent: Mar. 20, 1990

[54] ORNAMENTAL DEVICE ATTACHMENT FOR BICYCLE SPOKES

[75] Inventors: Wayne C. McDonald, Norcross; Larry M. Parker, Lilburn, both of Ga.

[73] Assignee: Cornerstone Products, Inc., Norcross, Ga.

[21] Appl. No.: 232,680

[22] Filed: Aug. 16, 1988

[51] Int. Cl.⁴ .................. B60B 7/06; D04D 7/04
[52] U.S. Cl. .................... 428/31; 280/288.4; 301/37 SA; 428/100
[58] Field of Search .......... 280/288.4; 301/37 SA; 428/31, 100

[56] References Cited

U.S. PATENT DOCUMENTS

| 2,621,081 | 12/1952 | Mann | 428/31 X |
| 3,466,774 | 9/1969 | Borresen | 428/31 X |
| 3,579,408 | 5/1971 | Dowhan | 428/31 X |
| 3,847,443 | 11/1974 | Laurion | 301/37 SA X |
| 4,470,663 | 9/1984 | Tresch et al. | 301/37 SA X |

Primary Examiner—Henry F. Epstein
Attorney, Agent, or Firm—Nicholas J. Aquilino

[57] ABSTRACT

An ornamental device structured to be attached to the spokes of a riding vehicle, such as a bicycle, including a body portion formed of semi-flexible material having a pictorial design thereon and spoke attaching tabs which engage the spokes for mounting the ornamental device to the vehicle.

4 Claims, 1 Drawing Sheet

ORNAMENTAL DEVICE ATTACHMENT FOR BICYCLE SPOKES

BACKGROUND AND SUMMARY OF THE INVENTION

The present invention relates to ornamental devices, and in particular to ornamental devices which are attachable to the spokes of a vehicle to provide an ornamental effect when riding.

It is well known to provide attachments to spokes of wheeled vehicles, such as bicycles, to provide aesthetic and ornamental designs. Small children have attached beads, ribbons, plastic and cardboard to spokes for a variety of decorative reasons.

The present invention contemplates an ornamental attachment for the spokes of a vehicle in the form of an elongated semi-flexible plastic material having a pictorial design thereon. Preferably, the design would be some mythical or cartoon type character or monster or vehicle representation like a car, truck or airplane which would provide a pleasing effect when attached to the vehicle. The device includes locking spoke attaching tabs which are designed to be folded upon themselves forming loops around the spoke to secure the device to the vehicle wheels.

Among the objects of the present invention are the provision of an ornamental device having a decorative picture thereon which is simple in design and which can be easily attached to the wheels of a vehicle to provide an aesthetically pleasing effect.

DESCRIPTION OF THE PREFERRED EMBODIMENT

Figure 1:
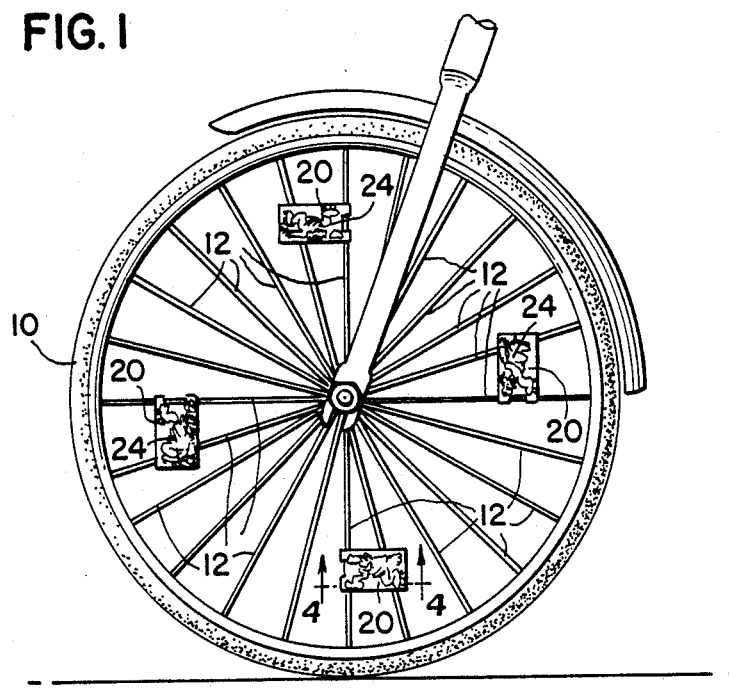
FIG. 1 is a pictorial view of a bicycle wheel having a plurality of the ornamental devices of the present invention attached thereto.

Referring to the drawings, a bicycle wheel 10 having a plurality of spokes 12 of conventional design supports a plurality of ornamental devices 20 of the present invention. Each ornamental device 20 is formed of an elongated semi-flexible material forming a body portion 22 having a pictorial design 24 imprinted or otherwise formed thereon. It is contemplated that the picture may take a variety of different shapes or sizes, it being preferable that a cartoon type character, a representation of an animal figure or a vehicle such as a car, truck, airplane or the like be depicted which would be aesthetically pleasing, particularly to smaller children. The device includes an end 26 having a securing means in the form of upper and lower locking tabs 28 and 30 which are positioned on the end 26 and spaced from each other. Each of the tabs 28 and 30 are structured to fit into slots 32 and 34 formed adjacent the tab end of the ornamental device.

Figure 4:
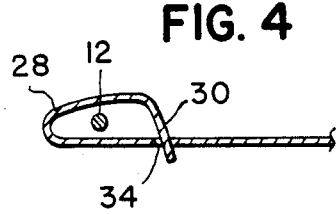
FIG. 4 is a sectional view taken along the lines 4—4 of FIG. 1.

In use, the tabs are folded over upon themselves and locked into the slots around a bicycle spoke. The tabs form a flexible loop which permits freedom of movement of the device around the spoke. See FIG. 4.

Figure 2:
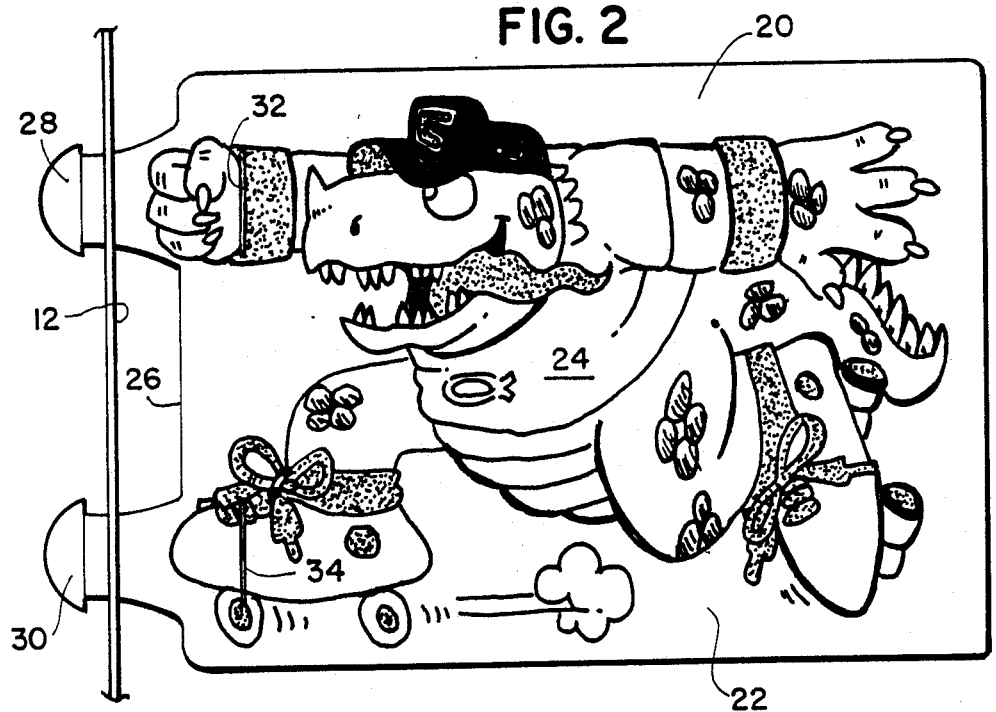
FIG. 2 is a plan view of the ornamental device of the invention.
Figure 3:
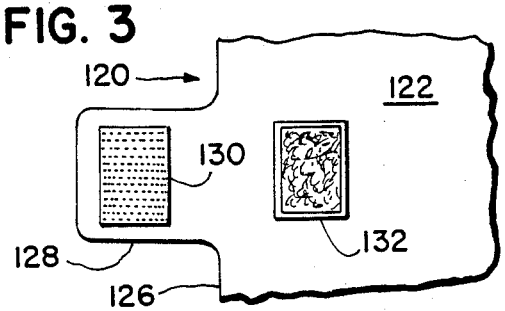
FIG. 3 is a view of a detail of an alternate embodiment of the ornamental device of the invention.

FIG. 3 illustrates a detail of the spoke securing means on an alternate embodiment of an ornamental device 120. As described with respect to FIGS. 1 and 2, the ornamental device 120 includes a body 122 having a design imprinted thereon. Tabs 128 (only one being shown) extend from the end 126 of the body portion 122 of the ornamental device 120. The securing means is a hook-and-loop type separable fastener including a first fastener member 130 on the tab 128 and a second fastener member 132 on the body portion 122 of the ornamental device 120.

In this embodiment, the tabs 128 are folded over around the spokes and the hook-and-loop fastener members 130 and 132 are fastened together forming a loop to support the ornamental device 120 on the spokes.

It will be appreciated that as the wheel is turned during the vehicle movement, that the ornamental devices will extend outwardly from the spokes because of centrifugal force and wind currents. During this movement, the device contacts various portions of the vehicle frame creating a noise in the process. A young child by using his imagination is able to relate the noise made by the device to the ornamental picture of the character thereon to create various effects.

It will be appreciated that variations may be made in the shape and overall design of the ornamental device without departing from the scope and spirit of the invention as defined in the following claims.

I claim:

1. An ornamental device structured to be attached to a wheel spoke of a riding vehicle comprising:
a body portion formed of semi-flexible material having an elongated shape and including an ornamental design thereon, said body portion including a first end structured to be attached to said riding vehicle spoke, and a second end free and unattached from said spoke; said first end including first and second spoke attaching tabs extending outwardly from said body portion, said tabs being positioned in-line on an edge of said first end of said body portion and spaced from each other on said edge; and securing means on said body portion structured to receive and hold said spoke attaching tabs, said tabs being folded back on themselves forming a loop when said tabs are engaged by said securing means, in use, said loops encircling said spoke and attatching said first end of said ornamental device thereto permitting the free end to fly away from said spoke when said vehicle is being operated.

2. The ornamental device of claim 1 wherein said tabs include locking notches and said securing means are slots to receive said tabs, said locking notches engaging said slots and maintaining said tabs therein.

3. The ornamental device of claim 1 wherein said tabs include one connecting member of a separable fastener and said body includes a complementary second connecting member of a separable fastener.

4. The ornamental device of claim 3 wherein said separable fastener is formed of hook-and-loop material.

* * * * *